United States Patent
Lange et al.

(10) Patent No.: US 8,371,788 B2
(45) Date of Patent: Feb. 12, 2013

(54) FASTENER FOR AUTOMOTIVE COMPONENTS

(75) Inventors: Wolfgang Lange, Lengerich (DE); Frank Rosemann, Muenzenberg (DE)

(73) Assignee: Newfrey LLC, Newark, DE (US)

( * ) Notice: Subject to any disclaimer, the term of this patent is extended or adjusted under 35 U.S.C. 154(b) by 312 days.

(21) Appl. No.: 12/933,032

(22) PCT Filed: Mar. 5, 2009

(86) PCT No.: PCT/US2009/036153
§ 371 (c)(1),
(2), (4) Date: Oct. 18, 2010

(87) PCT Pub. No.: WO2009/111620
PCT Pub. Date: Sep. 11, 2009

(65) Prior Publication Data
US 2011/0044782 A1    Feb. 24, 2011

(30) Foreign Application Priority Data
Mar. 6, 2008   (GB) .................................. 0804196.4

(51) Int. Cl.
*F16B 37/08*    (2006.01)
(52) U.S. Cl. ........................ 411/433; 411/112
(58) Field of Classification Search .......... 411/432–434, 411/112, 172–176, 183
See application file for complete search history.

(56) References Cited

U.S. PATENT DOCUMENTS

| | | | |
|---|---|---|---|
| 4,850,778 A | 7/1989 | Clough et al. | |
| 4,883,382 A * | 11/1989 | Mushya | 411/182 |
| 4,890,966 A * | 1/1990 | Umezawa | 411/340 |
| 5,746,559 A | 5/1998 | Shirai | |
| 5,871,320 A * | 2/1999 | Kovac | 411/182 |
| 6,059,502 A | 5/2000 | Konig et al. | |
| 6,615,459 B2 * | 9/2003 | Sano | 24/453 |
| 7,179,038 B2 | 2/2007 | Reindl | |
| 7,322,784 B2 * | 1/2008 | Castro et al. | 411/433 |
| 7,891,151 B2 * | 2/2011 | Sano | 52/506.05 |

FOREIGN PATENT DOCUMENTS

| | | |
|---|---|---|
| DE | 10 2006 007244 A1 | 8/2007 |
| EP | 1849687 A2 | 10/2007 |

* cited by examiner

*Primary Examiner* — Gary Estremsky
(74) *Attorney, Agent, or Firm* — Harness, Dickey & Pierce, P.L.C.

(57) ABSTRACT

A fastener for securing an undercover panel to an underside of a vehicle is disclosed. The fastener includes a body having a bore for receiving a threaded bolt extending from the underside of the vehicle, a flange for engaging a first side of the undercover panel, a plurality of resiliently deformable engaging fingers for allowing insertion of the bolt into the bore and to resist removal of the bolt from the bore, and a plurality of resilient engaging members for enabling the engaging members to pass in a first direction through an aperture in the undercover panel, and to resist removal of the fastener from the panel. A plurality of reinforcing members extend from the body to engage a respective engaging member, as a result of forces urging said undercover panel towards the underside of the vehicle, to resist flexing of the engaging members away from the body.

12 Claims, 5 Drawing Sheets

FASTENER FOR AUTOMOTIVE COMPONENTS

CROSS-REFERENCE TO RELATED APPLICATIONS

This is a U.S. National Phase Application of PCT/US2009/036153, filed Mar. 5, 2009. This Application claims the benefit of Great Britain Application No. 0804196.4, filed Mar. 6, 2008. The disclosures of the above applications are incorporated herein by reference.

BACKGROUND OF THE INVENTION

The present invention relates to fasteners for automotive components, and relates particularly, but not exclusively, to fasteners for securing an undercover panel to the underside of a vehicle floor.

Undercover panels are generally secured to the underside of a vehicle floor in order to cover components such as exhaust pipes, fuel lines and brake lines, in order to improve the aerodynamic efficiency of the vehicle. Undercover panels are generally made of thermoplastic materials, although it is becoming increasingly popular to use fabric materials to form such panels, which provide a more lightweight undercover panel than one made from thermoplastic material, and provide various manufacturing advantages. An example of a textile undercover panel of this type is supplied by Johann Borgers GmbH & Co. KG, Borgersstrasse, 46397 Bocholt, Germany. However, the use of fabric undercover panels also causes difficulties in securing the undercover panel to the underside of the vehicle, mainly because of the increased flexibility of the undercover panel compared with one made of thermoplastic material.

Fasteners for attaching sheet-like materials such as undercover panels to the underside of a vehicle are well known. For example, EP 1350712 discloses a fastener for attaching an undercover panel to a weld stud on the underside of a floor panel of a car body. The fastener comprises a pair of clips which are assembled to each other at an aperture in the undercover panel, from opposite sides of the undercover panel. The undercover panel with fasteners assembled thereto is then mounted to the underside of the car body by being pushed onto a weld stud on the vehicle underside during final vehicle assembly.

U.S. Pat. No. 5,871,320 discloses a retaining device for securing a layer of insulation material to sheet metal in the construction of motor vehicle interiors. The retaining device is formed as a single piece, and has a flange for abutting the surface of the layer of insulation material, and an articulated structure which can be inserted through a hole in the layer of insulation material. The articulated structure has locking fingers connected via live hinges to a push plate, so that flexing of the live hinges causes the layer of insulating material to be clamped between the locking fingers and the flange. The layer of insulating material with fasteners secured thereto is then pushed onto a weld stud on the sheet metal.

DE 102006007244 discloses a fastener formed as a single element by means of injection moulding and having first and second parts connected to each other by a frangible portion adapted to bleak when a predetermined axial compressive load is applied to the fastener. The fastener has a threaded portion for mounting to a weld stud, a flange for engaging a component and an anchor portion having flexible fingers which provide the fastener with a larger diameter than an aperture in the component to which the fastener is to be mounted. The fastener is inserted through the aperture from one side thereof so that the flexible fingers flex and pass through the aperture, and as the flange comes into abutment with the component, the flexible fingers flex back to their original position to retain the fastener on the component. The two parts of the fastener are then pushed together, which fractures the frangible part to secure the two parts of the fastener to each other and clamp the component between the parts. The component with fasteners secured thereto is then screwed onto a weld stud.

EP 1849687 discloses a fastener for attaching an undercover to the underside of a vehicle floor panel. The fastener comprises first and second tubular clips which are pushed together from opposite sides of the undercover material to clamp the undercover between the two clips of the fastener. The undercover with fasteners secured thereto is then mounted to a weld stud which is inserted into a bore of the fastener.

SUMMARY OF THE INVENTION

Preferred embodiments of the present invention seek to improve on the fasteners of the prior art, particularly by providing a fastener which is more cost effective and less labour intensive to assemble, and which has improved capability of withstanding the forces generated by undercover panels of fabric material.

According to an aspect of the present invention, there is provided a fastener for securing a first component to a second component, the fastener comprising:

a body having a bore therein adapted to receive a threaded bolt extending from a first component, wherein the bore extends from at least a first end of said body;

a flange extending from said body for engaging a first side of a second component;

a plurality of resilient first engaging members extending from said body, wherein said first engaging members are adapted to allow insertion of said bolt into the bore from said first end of said body and to engage a thread of said bolt to resist removal of said bolt from said bore;

a plurality of resilient second engaging members extending from said body and adapted to resiliently deform towards said body portion to enable said second engaging members to pass in a first direction through an aperture in the second component, and to resist removal of said fastener from the second component in a second direction, opposite to said first direction; and a plurality of reinforcing members extending from said body, wherein each said reinforcing member is adapted to engage a respective said second engaging member, as a result of forces urging said second component towards said first component, to resist flexing of said second engaging members away from said body.

By providing a plurality of reinforcing members extending from the body, wherein each said reinforcing member is adapted to engage a respective second engaging member, as a result of forces urging said second component towards said first component, to resist flexing of the second engaging members away from the body, this provides the advantage of enabling the fastener to withstand the larger forces which arise when an undercover of fabric material is mounted to the underside of a vehicle.

The body may comprise a first body part, from which said first and second engaging members extend, and a second body part, on which said first end of said body s provided, wherein the first and second body parts are connected to each other by a frangible portion, adapted to break when a predetermined axial compressive load is applied to said first and second body parts, to enable said first engaging members to enter said bore in said second body part.

By providing a frangible portion, adapted to break when a predetermined axial compressive load is applied to the first and second body parts, to enable the first engaging members to enter the bore in the second body part, this provides the advantage of enabling the second body part to maintain the first engaging members in engagement with the threaded bolt.

The second body part may further comprise at least one first retaining portion for engaging at least one second retaining portion on the first body part to retain the first engaging members in the bore in the second body part.

The or each said first retaining portion may be adapted to engage said at least one second retaining portion as a result of said first engaging members entering said bore in said second body part.

This provides the advantage of simplifying mounting of the second component with at least one fastener thereon to the first component.

In a preferred embodiment, at least one said first retaining portion comprises a respective deformable retaining member, and at least one said second retaining portion comprises a respective protrusion on said first body part, wherein at least one said deformable retaining member has a first surface for engaging a said protrusion to cause said retaining member to deform as a result of said first engaging members entering said bore in said second body part, and a second surface adapted to engage a said protrusion to retain the retaining member on the protrusion.

This provides the advantage of simplifying mounting of the fastener to the first component.

At least one said first surface may be inclined relative to a longitudinal axis of the bore.

The bore may extend into the first body part.

A plurality of said second engaging members may each comprise a respective third surface adapted to engage said first side of the second component, to cause deformation of said second engaging members to enable said second engaging members to pass through said aperture in said first direction, and a respective fourth surface adapted to engage a second side of the second component, to resist removal of said fastener from the second component in said second direction.

At least one said fourth surface may be inclined relative to the longitudinal axis of the bore.

This provides the advantage of allowing limited radial movement of the second component relative to the fastener, which allows dimensional changes arising during use to be accommodated.

The fastener may further comprise at least one biasing member extending from said body for causing a plurality of said first engaging members to be biased into engagement with the thread of the bolt.

This provides the advantage of assisting in securing the fastener to the first component.

At least one said biasing member may comprise a respective resilient leg adapted to engage the first component and to flex as a result of movement of the first and second components towards each other.

According to another aspect of the invention, there is provided a panel assembly comprising a panel having at least one aperture, and at least one fastener as defined above mounted to a respective said aperture.

BRIEF DESCRIPTION OF THE DRAWINGS

Preferred embodiments of the invention will now be described, by way of example only and not in any limitative sense, with reference to the accompanying drawings, in which:—

PREFERRED EMBODIMENT OF THE PRESENT INVENTION

Figure 1:
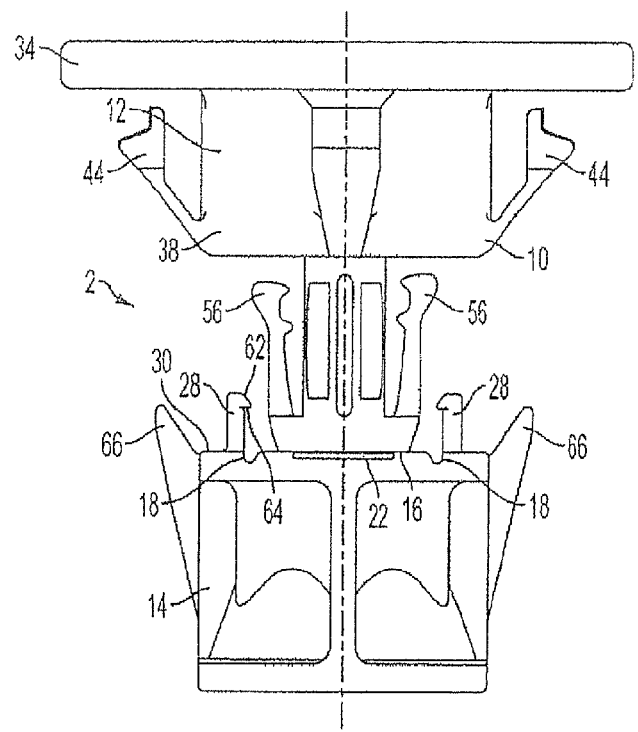
FIG. 1 is a schematic side view of a fastener of a first embodiment of the present invention prior to being mounted to an undercover panel.
Figure 2:
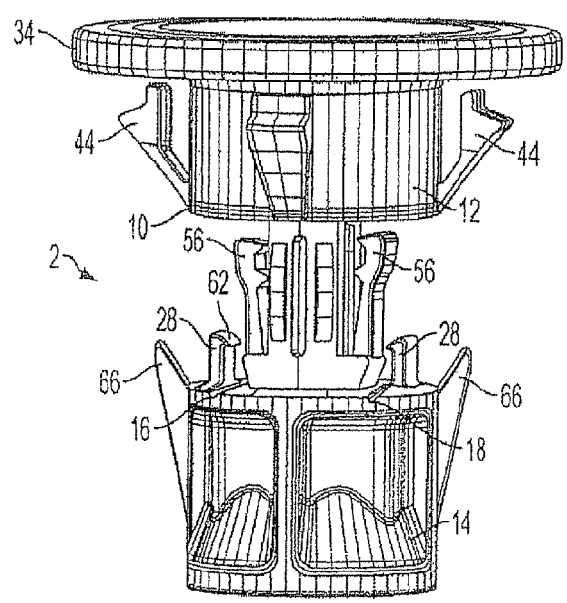
FIG. 2 is a perspective side view of the fastener of FIG. 1.
Figure 3:
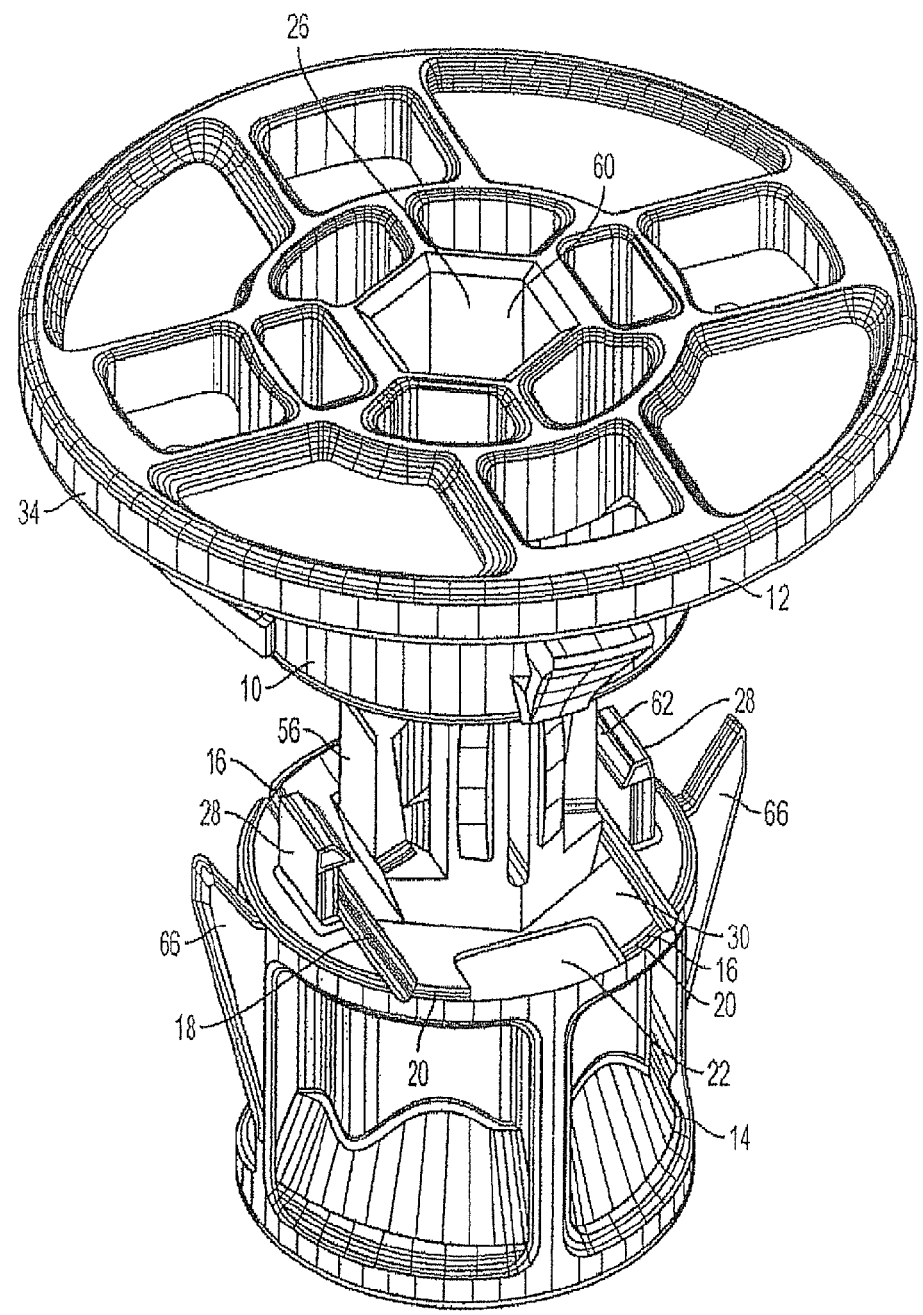
FIG. 3 is a perspective view from one side and above of the fastener of FIG. 1.

Referring to FIGS. 1 to 5, a fastener 2 for securing a fabric undercover panel 4 to a threaded bolt 6 protruding from an underside 8 of a vehicle (not shown) has a one-piece fastener body 10 of plastics material formed by injection moulding. The fastener body has a first body part 12 in the form of a panel clip for mounting the fastener 2 to the undercover panel 4, and a second body part 14 in the form of a retaining part, the first 12 and second 14 body parts being connected to each other by a weakened portion 16 comprising a pair of grooves 18 and a respective pair of webs 20 between the grooves 18 and each of a pair of apertures 22. The grooves 18 and webs 20 form a thinner region of plastic material than the adjacent regions, as a result of which the plastic material at the grooves 18 and webs 20 fractures when a predetermined axial compressive load is applied to the fastener body 10.

The second body part 14 has a tapering opening 24 at an end thereof remote from the first body part 12, the opening 24 leading to a cylindrical bore 26 for receiving the threaded bolt 6 on the underside 8 of the vehicle. The bore 26 extends from the tapered opening 24 through the first 12 and second 14 body parts. The second body part 14 is also provided with a pair of resiliently deformable retaining members 28 extending upwardly from an end surface 30 of the second body part 14, the retaining members 28 being separated from the first body part 12 by the grooves 18 and webs 20, so that the retaining members 28 remain on the second body part 14 when the weakened portion 16 fractures. The retaining members 28 are arranged to engage a pair of corresponding protrusions 32 on the first body part 12, the function of which will be described in greater detail below.

The first body part 12 also comprises a flange 34 for abutting a first surface 36 (FIG. 5) of the undercover 4, an outer portion 38, and an inner portion 40 on which the protrusions 32 are provided. Channels 42 are provided between the inner 40 and outer 38 portions for receiving the engaging members 28 as the lower part of the first body part 12 is pushed into the bore 26 of the second body part 14 after the weakened portion 16 fractures.

Figure 4:
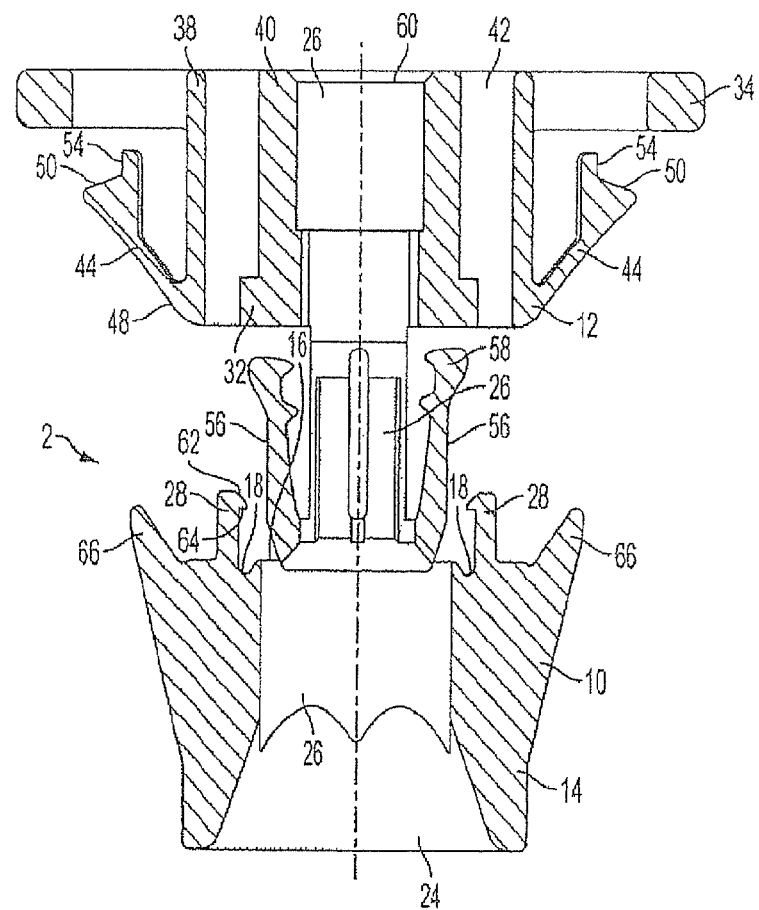
FIG. 4 is a cross sectional side view of the fastener of FIG. 1.
Figure 5:
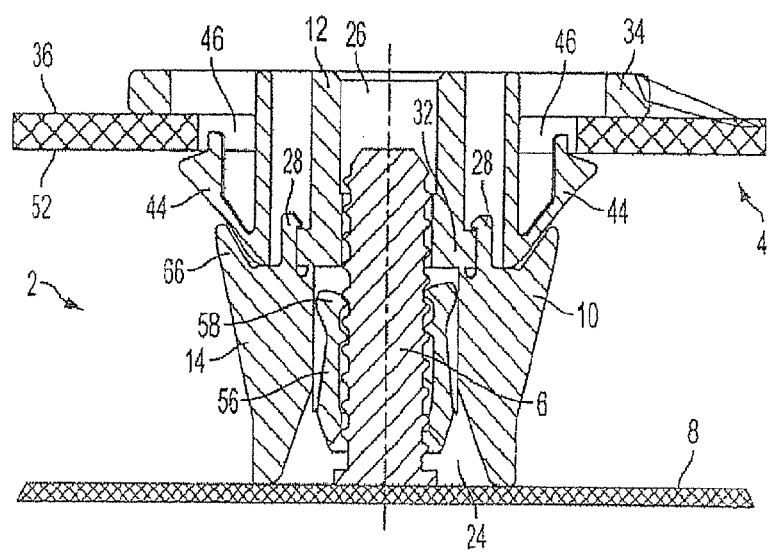
FIG. 5 is a cross sectional side view of the fastener of FIG. 1 securing an undercover panel to the underside of a vehicle.

A pair of resiliently deformable engaging members 44 extend outwardly and upwardly from the outer portion 38 and are arranged to have a slightly larger external diameter than the diameter of an aperture 46 in the undercover panel 4 to which the fastener 2 is to be mounted. The engaging members 44 each have an external inclined surface 48, an upper inclined surface 50 for abutting a second surface 52 of the undercover panel 4, and a vertical abutment surface 54 extending from the upper inclined surface 50. This enables the fastener 2 to be easily mounted to the undercover panel 4 by inserting it into the aperture 46 in a downward direction as shown in FIG. 4, so that the second body part 14 passes through the aperture 46, the external inclined surfaces 48 of the engaging members 44 engage the first surface 36 of the panel 4 at the edge of the aperture 46 and are resiliently flexed inward to allow the engaging members 44 to pass through the aperture 46, and then return to their position shown in FIG. 4 such that the upper inclined surfaces 50 and/or the abutment surfaces 54 abut the second surface 52 of the panel 4 at the edge of the aperture 46 if the fastener is subjected to forces tending to remove it from the undercover panel 4. Limited radial movement of the undercover panel 4 relative to the fastener 2 is also possible to allow dimensional changes, for example as a result of thermal expansion during use of the vehicle, to be taken up.

The first body part 12 is also provided with resiliently deformable retaining fingers 56 extending from a lower part of the first body part 12. The retaining fingers 56 each have a bifurcated distal end 58 for engaging the screw thread of the bolt 6. The retaining fingers 56 can flex resiliently radially outwards to enable passage of the bolt 6 into the bore 26, but can move radially inwards so that the distal ends 58 pass through slots (not shown) to engage the thread of the bolt 6 to prevent the bolt 6 from being pulled out of the bore 26. The upper part of the first body part 12 at the upper end of the bore 26 is provided with a suitably shaped aperture 60 for receiving a suitable tool such as a socket head wrench (not shown) to enable the fastener to be unscrewed from the bolt 6.

The operation of the fastener 2 will now be described.

One or more fasteners 2 are firstly mounted to the undercover panel 4 by inserting each fastener through an aperture 46 in a downward direction as shown in FIG. 4 until the flange 34 abuts the first surface 36 of the undercover panel 4. This causes the second body part 14 of each fastener 2 to pass through the corresponding aperture 46, the external inclined surfaces 48 of the engaging members 44 to engage the first surface 36 of the panel 4 at the edge of the aperture 46 so that they are resiliently flexed inward to allow the engaging members 44 to pass through the aperture 46, and then return to their position shown in FIG. 4 shortly before the flange 34 comes into abutment with the undercover panel 4 so that the upper inclined surfaces 50 and/or the abutment surfaces 54 abut the second surface 52 of the panel 4 at the edge of the aperture 46 if the fastener is subjected to forces tending to remove it from the undercover panel 4. The assembly consisting of the undercover panel 4 and the fasteners 2 is then delivered to the vehicle manufacturer.

In order to secure the undercover panel 4 to the underside of the vehicle at the location of vehicle assembly, the assembly comprising the undercover panel 4 and fasteners 2 is pushed onto the underside of the vehicle such that the threaded bolts 6 projecting from the underside of the vehicle are received in the corresponding tapered openings 24 and the bores 26 of the second body parts 14 of the fasteners 2. The undercover panel 4 is then pushed further towards the underside 8 of the vehicle, such that when the lower end of the second body part 14 of each fastener 2 as shown in FIGS. 1 to 5 (i.e. the end of the second body part 14 remote from the first body part 12) comes into contact with the underside 8 of the vehicle, the continued application of an axial compressive force to the fastener 2 causes the weakened portion 16 to break.

As a result, the lower part carrying the retaining fingers 56 of the first body part 12 of each fastener 2 is pushed into the bore 26 of the corresponding second body part 14, so that the bore 26 in the second body part 14 of each fastener 2 prevents the corresponding retaining fingers 56 from moving out of engagement with the thread of the bolt 6. This prevents the threaded bolt 6 from being pulled out of the bore 26 in the second body part 14. At the same time, the retaining members 28 on the second body part 14 engage the corresponding protrusions 32 on the first body part 12 by means of an inclined leading surface 62 of each retaining member 28 sliding over the corresponding protrusion 32 and causing the retaining member 28 to deform, until the leading surface 62 has passed the protrusion 32 to enable the retaining member 28 to regain its original shape and cause a retaining surface 64 to engage the protrusion 32 to retain the first 12 and second 14 body parts in position relative to each other.

A pair of reinforcing members 66 extend from the second body part 14 of each fastener 2, and are brought into proximity to the underside of respective engaging members 44 as a result of the lower part of the first body part 12 being moved into the bore 26 in the second body part 14. As a result, forces tending to push the undercover panel 4 towards the underside 8 of the vehicle, for example caused by air pressure as a result of driving the vehicle at high speed, cause the outer inclined surfaces 48 of the engaging members 44 to engage the reinforcing members 66. The reinforcing members 66 prevent damage to the engaging members 44, as a result of which the fasteners 2 can withstand the forces generated by the undercover panel 4 in use.

In order to remove the undercover panel 4 from the vehicle, for example for maintenance purposes, a suitable tool such as a socket head wrench, is located in the aperture 60 at the upper end of the fastener 2 to enable the fastener 2 to be unscrewed from the threaded bolt 6. The panel 4 can then be re-attached by screwing the fastener 2 onto the threaded bolt 6.

Figure 6:
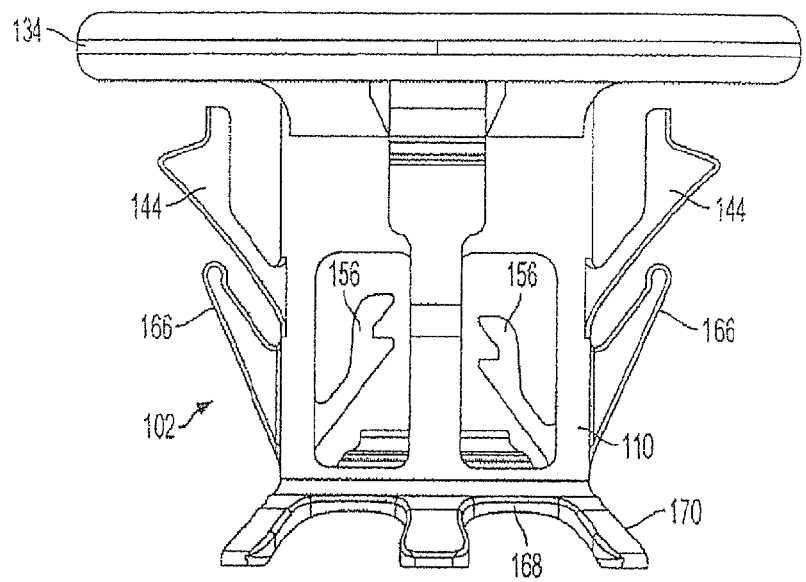
FIG. 6 is a side view of a fastener of a second embodiment of the present invention prior to being mounted to an undercover panel.
Figure 7:
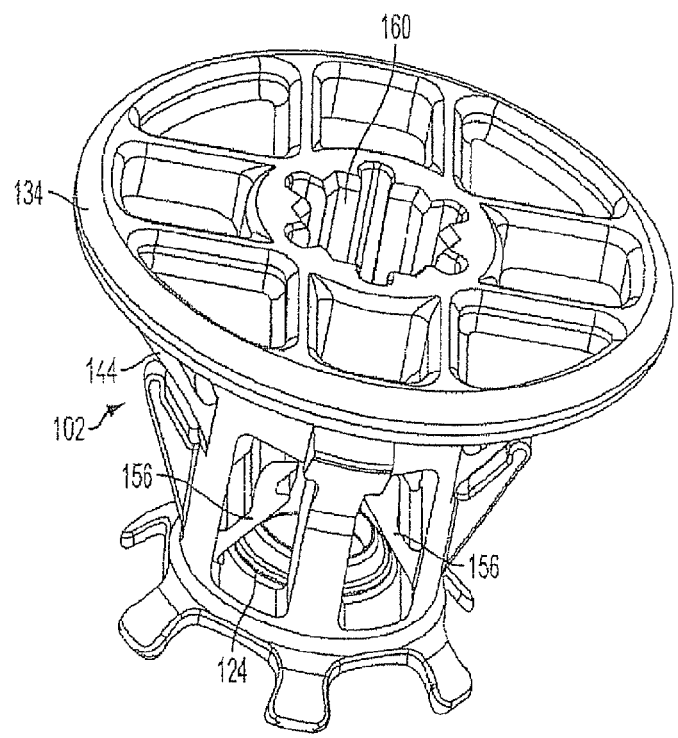
FIG. 7 is a perspective view from one side and above of the fastener of FIG. 6.
Figure 8:
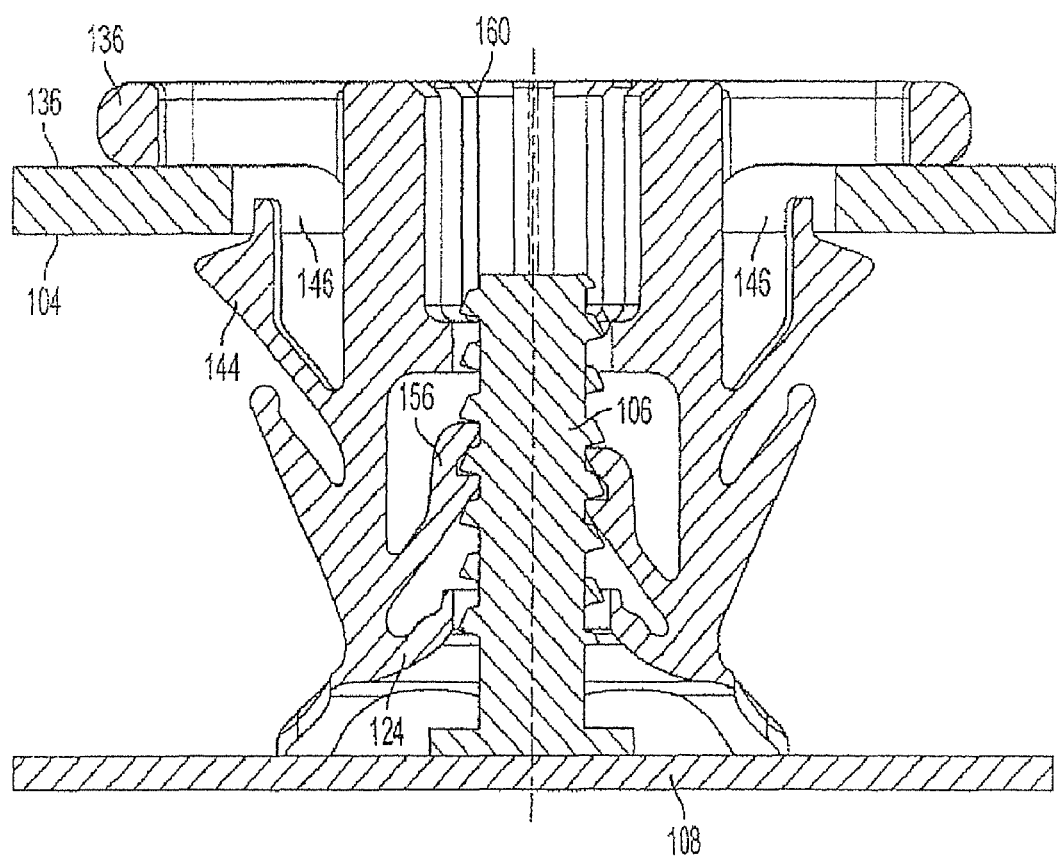
FIG. 8 is a side cross section view of the fastener of FIG. 6 securing an undercover to the underside of a vehicle

FIGS. 6 to 8 show a fastener of a second embodiment of the present invention, and parts common to the embodiment of FIGS. 1 to 5 are denoted by like reference numerals but increased by 100. The fastener 102 of the embodiment of FIGS. 6 to 8 has a fastener body 110 formed as a single piece by means of injection moulding. A flange 134, for engaging the first side 136 of an undercover panel 104, deformable engaging members 144 and retaining fingers 156 extend from the fastener body 110. These operate in an identical manner to the corresponding parts of the embodiment of FIGS. 1 to 5 and will therefore not be described in greater detail herein. The upper part of the fastener body 110 is also provided with a hexagonal aperture 160 for engaging a tool (not shown) to enable the fastener 102 to be unscrewed from the threaded bolt 106. The lower part of the fastener body 110 shown in FIGS. 6 to 8 is also provided with a tapered opening 124 to assist in correct location of the fastener 102 on the bolt 106.

The fastener 102 differs from the embodiment of FIGS. 1 to 5 in that although the fastener 102 is formed as a single part by injection moulding, it does not consist of two parts connected to each other by means of a frangible section. As a result, reinforcing members 166 are located in close proximity to the engaging members 144 to allow radially inward flexing of the engaging members 144 as a result of passage of the engaging members 144 through an aperture 146 in the undercover panel 104 to enable the fastener 102 to be mounted to the undercover panel 104, but to resist outward flexing or breaking of the engaging members 144 as a result of movement of the undercover panel 104 towards the underside 108 of the vehicle.

An end 168 of the fastener body 110 remote from the flange 134 is provided with resilient members 168 which flex, as a result of compression of the fastener 102 against the underside 108 of the vehicle, to provide a biasing force urging the resilient retaining fingers 156 into engagement with the thread of the bolt 106 prevent removal of the fastener 102 from the bolt 106 by means of pulling, although the fastener 102 can be unscrewed from the bolt 106 by application of a suitable tool to the aperture 160.

In the case of the undercover panel 104 being pushed towards the underside 108 of the vehicle as a result of strong air flow caused by driving at high speed, the engaging members 144 flex outwardly and come into contact with the reinforcing members 166 which prevent further flexing and/or destruction of the engaging members 144 to retain the fastener 102 on the threaded bolt 106. The embodiment of FIGS. 6 to 8 has the advantage over that of FIGS. 1 to 5 that it is of simpler construction and uses less material.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A fastener for securing a first component to a second component, the fastener comprising:
   (i) a body having a bore therein adapted to receive a threaded bolt extending from a first component, wherein the bore extends from at least a first end of said body;
   (ii) a flange extending from said body for engaging a first side of a second component;
   (iii) a plurality of resilient first engaging members extending from said body, wherein said first engaging members are adapted to allow insertion of said bolt into the bore from said first end of said body and to engage a thread of said bolt to resist removal of said bolt from said bore;
   (iv) a plurality of resilient second engaging members extending from said body and adapted to resiliently deform towards said body portion to enable said second engaging members to pass in a first direction through an aperture in the second component, and to resist removal of said fastener from the second component in a second direction, opposite to said first direction; and
   (v) a plurality of reinforcing members extending from said body, wherein each said reinforcing member is adapted to engage a respective said second engaging member, as a result of forces urging said second component towards said first component, to resist flexing of said second engaging members away from said body.

2. A fastener according to claim 1, wherein the body comprises a first body part, from which said first and second engaging members extend, and a second body part, on which said first end of said body is provided, wherein the first and second body parts are connected to each other by a frangible portion, adapted to break when a predetermined axial compressive load is applied to said first and second body parts, to enable said first engaging members to enter said bore in said second body part.

3. A fastener according to claim 2, wherein the second body part further comprises at least one first retaining portion for engaging at least one second retaining portion on the first body part to retain the first engaging members in the bore in the second body part.

4. A fastener according to claim 3, wherein the or each said first retaining portion is adapted to engage said at least one second retaining portion as a result of said first engaging members entering said bore in said second body part.

5. A fastener according to claim 4, wherein at least one said first retaining portion comprises a respective deformable retaining member, and at least one said second retaining portion comprises a respective protrusion on said first body part, wherein at least one said deformable retaining member has a first surface for engaging a said protrusion to cause said retaining member to deform as a result of said first engaging members entering said bore in said second body part, and a second surface adapted to engage a said protrusion to retain the retaining member on the protrusion.

6. A fastener according to claim 5, wherein at least one said first surface is inclined relative to a longitudinal axis of the bore.

7. A fastener according to claim 2, wherein the bore extends into the first body part.

8. A fastener according to claim 1, wherein a plurality of said second engaging members each comprise a respective third surface adapted to engage said first side of the second component, to cause deformation of said second engaging members to enable said second engaging members to pass through said aperture in said first direction, and a respective fourth surface adapted to engage a second side of the second component, to resist removal of said fastener from the second component in said second direction.

9. A fastener according to claim 8, wherein at least one said fourth surface is inclined relative to the longitudinal axis of the bore.

10. A fastener according to claim 1, further comprising at least one biasing member extending from said body for causing a plurality of said first engaging members to be biased into engagement with the thread of the bolt.

11. A fastener according to claim 10, wherein at least one said biasing member comprises a respective resilient leg adapted to engage the first component and to flex as a result of movement of the first and second components towards each other.

12. A panel assembly comprising a panel having at least one aperture, and at least one fastener according to claim 1 mounted to said aperture.

* * * * *